United States Patent [19]

Yasui et al.

[11] 4,372,567
[45] Feb. 8, 1983

[54] ANTI-ROLLING SYSTEM FOR SNOWMOBILE OF SMALL SIZE

[75] Inventors: Toshihiro Yasui; Wayne L. Warnke, both of Coon Rapids, Minn.

[73] Assignee: Yamaha Hatsudoki Kabushiki Kaisha, Iwata, Japan

[21] Appl. No.: 216,645

[22] Filed: Dec. 17, 1980

[51] Int. Cl.$^3$ .............................................. B62B 17/04
[52] U.S. Cl. ................................. 280/21 R; 180/182
[58] Field of Search ............... 280/21 R, 25; 180/182, 180/183, 184, 185, 186, 187, 188, 189, 190, 191, 192, 193, 194, 195, 196

[56] References Cited

U.S. PATENT DOCUMENTS

| 3,674,103 | 2/1972 | Kiekhaefer | 280/25 |
| 3,931,862 | 1/1976 | Cote | 280/21 R |
| 4,143,729 | 3/1979 | West | 280/21 R |

*Primary Examiner*—Joseph F. Peters, Jr.
*Assistant Examiner*—John A. Carroll
*Attorney, Agent, or Firm*—Ernest A. Beutler

[57] ABSTRACT

A suspension arrangement for the steering skis of a snowmobile that permits soft ride through high suspension travels while at the same time prevents roll during cornering. The suspension system includes an element that is moveable with each of the skis during its suspension travel but which does not rotate with the ski during steering. Each of these respective elements is coupled to a torsion bar for loading the torsion bar upon relative vertical movement between the skis so as to resist body roll.

6 Claims, 5 Drawing Figures

ANTI-ROLLING SYSTEM FOR SNOWMOBILE OF SMALL SIZE

BACKGROUND OF THE INVENTION

This invention relates to a suspension system for a snowmobile and particularly to an anti-roll suspension for the steering skis of such a vehicle.

Due to the wide variety of terrains over which a snowmobile travels, it is desirable to provide a suspension, particularly for the steering skis, which permits a relatively large degree of suspension travel. Such an arrangement permits good riding over surfaces which have a rough surface consisting of small irregularities. The smaller size snowmobile conventionally uses a leaf spring type suspension. Such suspension offers a relatively harsh ride over surfaces of the aforedescribed type because of the limited suspension travel. Therefore, it has been proposed to adapt strut type suspensions for such applications since such suspensions offer a wide degree of suspension movement. When large suspension travels are permitted, however, there is a high degree of body roll during cornering which is unsatisfactory, particularly when cornering at high speeds. It has, therefore, been proposed to provide a torsion bar anti-roll system for the steering skis of snowmobiles. However, the use of such systems present certain difficulties in that an arrangement must be incorporated so that the connection between the ends of the torsion bar and the skis does not restrict their steering travel.

It is, therefore, a principal object of this invention to provide an anti-roll system for the steering skis of a snowmobile which does not adversely effect the steering.

SUMMARY OF THE INVENTION

This invention is adapted to be embodied in a suspension system for the steering skis of a snowmobile of the like. Suspensions means suspend each of the skis for movement in a generally vertical direction relative to the body of the snowmobile. The skis are each supported for steering movement about a respective steering axis. The suspension means includes a pair of elements each associated with a respective one of the skis. Each of the suspension means elements is moveable vertically with the respective ski during its suspension movement and is fixed against rotation about the respective ski steering axis for steering movement of that ski without corresponding rotation of its associated suspension element. A torsion bar is carried by the snowmobile and means are provided for loading the torsion bar upon movement of the respective suspension elements for torsional loading of the torsion bar upon vertical suspension movement of the ski without effecting loading of the torsion bar upon steering rotation of the ski.

DETAILED DESCRIPTION OF THE PREFERRED EMBODIMENT

Figure 1:
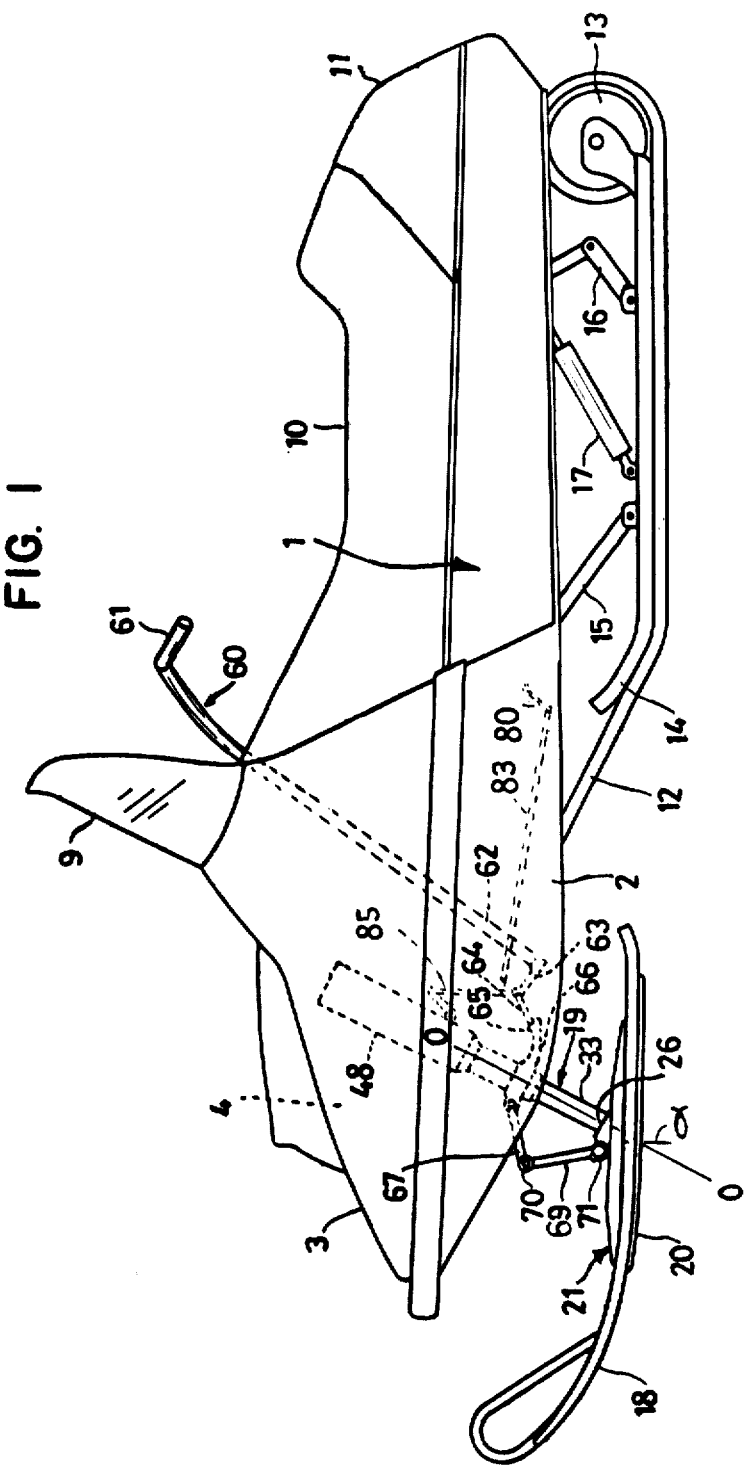
FIG. 1 is a side elevational view of a small snowmobile embodying this invention.
Figure 2:
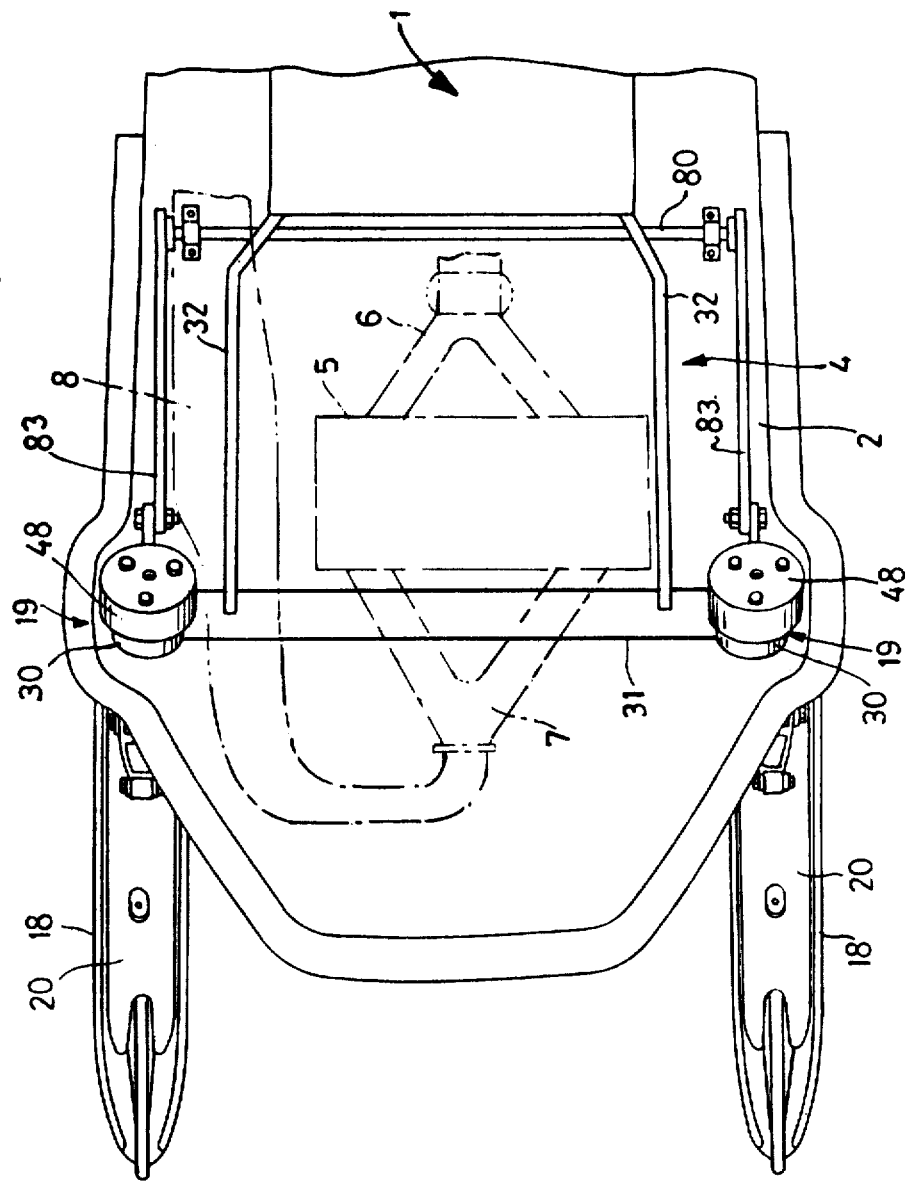
FIG. 2 is a top plan view of the forwardmost portion of the snowmobile.

In the drawings the reference numeral 1 indicates generally a snowmobile constructed in accordance with this invention. The snowmobile, has a body which includes a bottom cover 2 and upper front cover 3. The covers 2 and 3 define an engine compartment, indicated generally by the reference numeral 4. An engine 5, of any known type such as an air cooled, two-cycle, two-cylinder engine, is located in the engine compartment 4. The engine 5 includes an induction system, indicated schematically as 6, an exhaust manifold indicated schematically at 7, and a muffler 8 (FIG. 2). The engine 5 drives the snowmobile 1 through a v-belt type automatic transmission mechanism through an appropriate sprocket assembly (not shown).

At the rear of the upper front cover 3, there is disposed a windshield 9 behind which a seat 10 and luggage compartment 11 are positioned, as is well known in this art.

The V-belt type automatic transmission drives a main drive belt 12 in any known manner, for example, by means of a forward input sprocket (not shown). The rear end of the drive belt 12 runs around a guide wheel 13 and across a guide rail 14. The belt 12 is suspended relative to the body of the snowmobile 1 by means of links 15 and 16, a shock absorber 17, and a spring (not shown) in any known manner.

At the forward end of the snowmobile 1 there are a pair of front steering skis 18. The skis 18 underlie in part the bottom cover 2 and are suspended by respective strut type suspensions, indicated generally by the reference numeral 19 and shown in more detail in FIG. 3.

Figure 3:
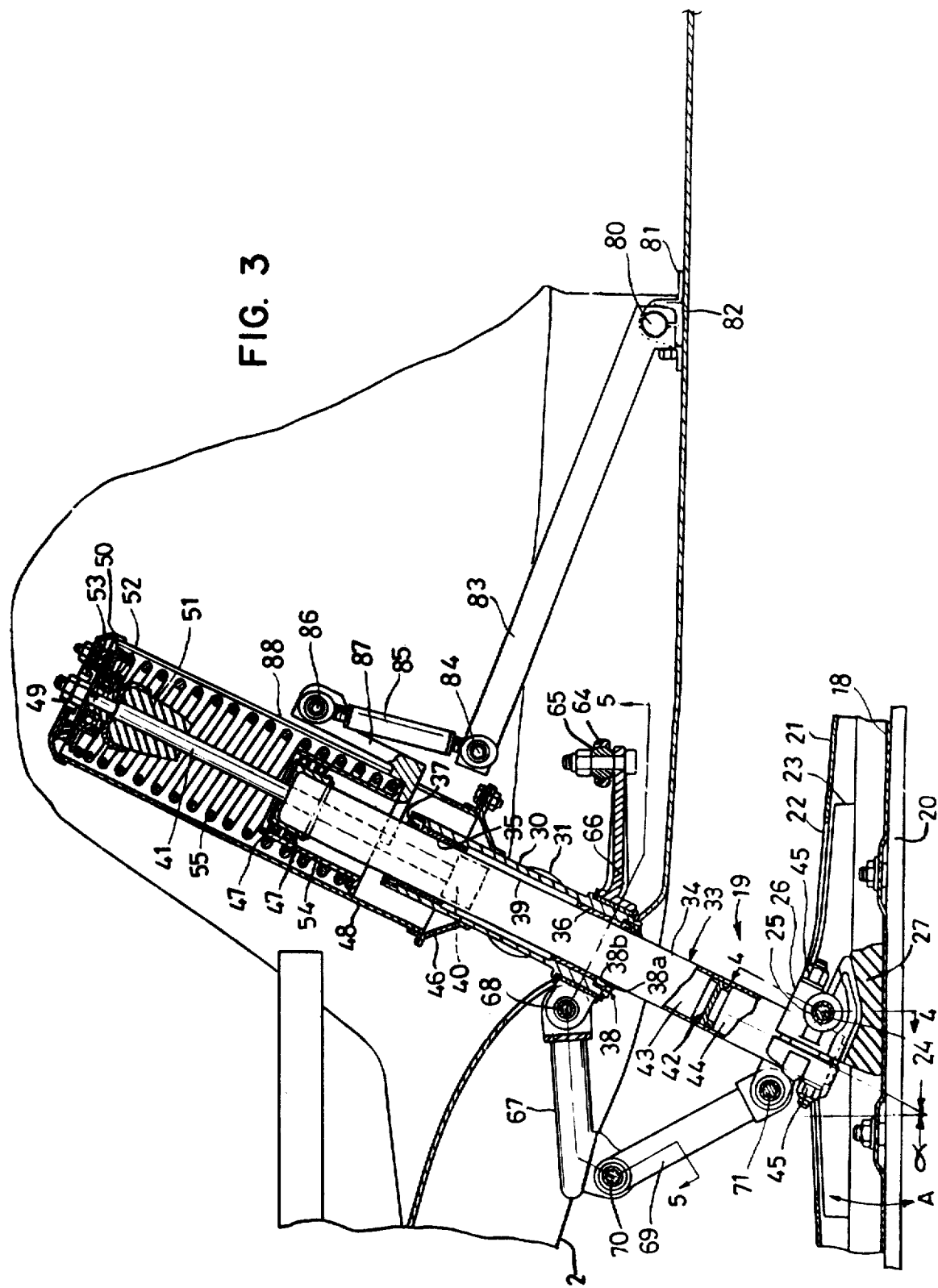
FIG. 3 is a side elevational view, with portion shown in section, showing the steering ski suspension system.
Figure 4:
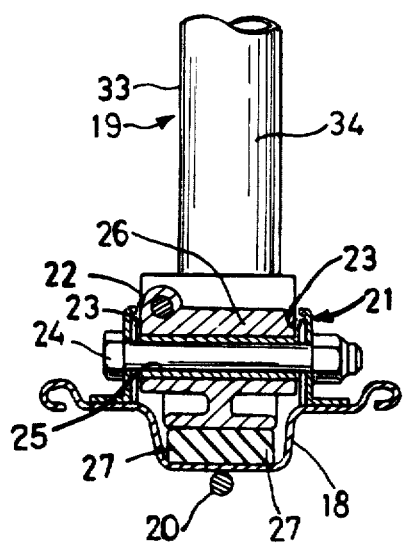
FIG. 4 is an enlarged cross-sectional view taken along the line 4—4 of FIG. 3.
Figure 5:
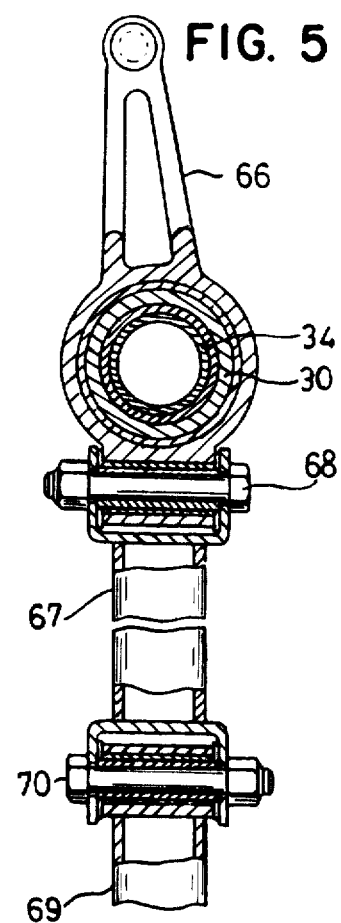
FIG. 5 is an enlarged cross-sectional view taken along the line 5—5 of FIG. 3.

Each of the skis 18 has a cross-sectional configuration as best shown in FIG. 4. A metal runner 20 is affixed to the underside of the ski 18 and extends for a substantial portion of its length, as is well known. The skis 18 have a generally channel shape construction in cross-section and have affixed to their center portions a cover, indicated generally by the reference numeral 21, which is of a dome cross-sectional shape having a central opening 22. Opposite sides of the cover 21 are reinforced by a pair of longitudinally extending plates 23. Positioned between the plates 23 and extending upwardly through the opening 22, is a connecting bracket 26 which affords the connection between the struts 19 and the skis 18 as will be described. The lower end of the bracket 26 is pivotally connected to the cover plate 21 and respective ski 18 by means of a bolt and nut assembly 24 and bushing 25. The lower end of the bracket 26 engages the upper surface of a rubber damper 27. The lower end of the damper 27 is interposed between the bracket 26 and the uppermost surface of the channel of the ski 18 so as to exert a restoring force on the ski 18 so that it tends to retain the ski 18 in a substantially horizontal position relative to the body of the snowmobile 1. The damper 27 exerts a force on the ski 18 relative to the pivot axis defined by the bolt and nut assembly 24 which acts in the direction of the arrow "A" as shown in FIG. 3.

The construction of the strut assembly 19 will now be described, by reference primarily to FIG. 3. Each strut assembly 19 includes a cylindrical housing 30 that is fixed to a cross member 31 of the frame of the snowmobile 1 so as to define a generally vertically extending steering axis which has a predetermined caster angle α with respect to the vertical. This steering axis is identified by the line O-O in the drawings. The cross member 31 is a part of the snowmobile frame and in the illustrated embodiment is affixed to the longitudinally extending frame members 32 in any known manner (FIG. 2).

A hydraulic shock absorber, indicated generally by the reference numeral 33, has its cylinder 34 slideably and rotationally supported within the housing 30 at each side of the cross member 31 for axial movement along the line O-O and for steering rotation about this axis. For this purpose bearings 35 and 36 are interposed between the housing 30 and a cylindrical outer surface of the cylinder 34. Adjacent the upper and lower surfaces of the bearings 35 and 36, seals 37 and 38 are provided. These seals 37 and 38 serve the normal purpose of protecting the bearings 35 and 36 from the ingress of foreign material. The lower seal 38 is provided with a wiping lip 38a which extends downwardly and outwardly and engages the surface of cylinder 34 so as to prevent intrusion of ice from the environment into the interior of the assembly. An oil sealing lip 38b is formed integrally with the seal 38 so as to provide oil retention and to insure against leakage downwardly from this area. A grease and lubricating chamber 39 of annular configuration is provided between the seal 37 and the oil seal lip 38b which may be lubricated in a suitable manner so as to lubricate the suspension for each ski.

The shock absorber 33 for each ski 18 also includes a piston 40 which is affixed to a piston rod 41 and which extends into the bore of the cylinder 34 and which with the other interior components of the shock absorber 33 may be appropriately valved so as to provide the desired shock absorber characteristics. A free piston 42 is supported in the lower end of the cylinder 34 below the shock absorber piston 40 so as to provide an upper chamber 43 which is charged with oil, and a lower chamber 44 which is charged with a gas such as nitrogen under a higher than atmospheric pressure so as to urge the piston 40 and piston rod 41 upwardly relative to the shock absorber cylinder 34 as is well known in this art.

The lower end of the cylinder 34 is affixed to the bracket 26 against radial and axial movement so as to directly affix the ski 18 to the lower end of the suspension system 19. For this purpose, the bracket 26 is formed with an appropriate bore and clamping arrangement which includes clamping bolts 45 and appropriate nuts so that the bracket 26 will be directly affixed to the lower end of the cylinder housing 34. Thus, vertical movement of the ski 18 will be directly transmitted to the cylinder 34. As has been previously noted, the skis 18 may pivot relative to the cylinder 34 about the pivot bolts 24.

At its upper end the cylinder housing 30 extends through and is affixed as by welding to a flange plate 46 which is in turn affixed to a cylinder housing 48 coaxially disposed with the shock absorber cylinder 34. The housing 48 is fixed in any suitable manner to the snowmobile frame. The upper end of the housing 48 has an opening 49 through which the upper end of the piston rod 41 extends. The upper end of the piston rod 41 passes through an elastomeric jounce stopper 51 and is affixed, by means of a nut or the like, to the inner race of a thrust bearing 52. The outer race of the thrust bearing 52 is affixed both axially and against rotation relative to the cap of the upper end of the housing 48 in any known manner by means which includes an elastomeric seal 53.

Also affixed to the outer race of the thrust bearing 52 is a spring seat 50. The connection between the piston rod 41 and housing 48 through the thrust bearing 52 holds the piston rod 41 against axial movement but permits its rotation about the steering axis O-O.

A lower spring seat 54 is fixed for axial movement with the shock absorber cylinder 34. However, the cylinder 34 is free to rotate relative to the lower spring seat 54. For this purpose, rotational thrust bearings 47 are interposed between the cylinder 34 and lower spring seat 54. A coil spring 55 is interposed between the spring seats 50 and 54. The spring 55 will be loaded upon relative movement between the piston 40 and the cylinder 34 and the associated spring seats 50 and 54. The spring 55 further acts to suspend the snowmobile body from the skis 18, as is believed to be apparent from the foregoing description.

As has been noted, the skis 18 are rotatable about the steering axis O-O for steering movement as well as being vertically moveable relative to the body of the snowmobile 1 along this axis. Thus, the axis O-O serves as a steering axis as well as a suspension axis, which is generally vertically upstanding except for the caster angle α.

A steering system, indicated generally by the reference numeral 60, is provided for steering the snowmobile 1 by turning of the skis 18 about their respective steering axes O-O. This steering system includes an operator-controlled handlebar 61 which is affixed to rotate a steering column 62, which is, in turn rotatably supported by the frame of the snowmobile 1 in any known manner. At the lower end of the steering column 62, there is affixed a pitman arm 63 which extends forwardly and which has the known type of pivotal connection to right and left tie rods 64. The opposite ends of each of the tie rods 64 are pivotally connected by ball joints 65 to steering arms 66. The steering arms 66 at each side of the snowmobile 1 are journaled upon cylindrical outer surfaces and interposed bearings of the cylindrical housing 30 adjacent the seal 38.

Each steering arm 66 has a forwardly extending portion which is connected to the trailing end of a downwardly and forwardly extending suspension link 67 by means of a pivot pin 68. The forward end of each link 67 is pivotally connected to the corresponding end of a downwardly extending trailing link 69 by means of a pivot pin 70. The lower ends of the links 69 are bifurcated and are pivotally connected with the brackets 26 of the respective ski 18 by means of pivot pins in the form of suspension bolts 71. The pivot pins 68, 70 and 71 have their pivot axes disposed parallel to each other and extend at a right angle to the steering axis O-O.

The advantage of the strut type suspension 19 in connection with a snowmobile centers around the fact that it permits substantial suspension travel of the skis 18 relative to the snowmobile frame. This permits a relatively soft ride which would not be possible with a more conventional type of leaf spring suspension normally used with small snowmobiles. However, such large suspension travel raises the problem of roll and possible reduction in control when turning, particularly at high speeds. In order to obviate these difficulties, an anti-roll torsion bar, indicated generally by the reference numeral 80, is provided.

The torsion bar 80 extends transversely of the snowmobile 1 and is positioned above the lower cover 2 and beneath the seat 10 in the illustrated embodiment. The torsion bar 80 is supported at its ends by means of brackets 81, which are fixed in any suitable manner to the snowmobile 1. Elastomeric bearings 82 are interposed between the brackets 81 and the torsion bar 80 so as to provide the suspension for the torsion bar 80 without significant resistance to the rotation of the bar 80 relative to the body of the snowmobile 1.

Forwardly extending arms 83 are rigidly connected to the opposite ends of the torsion bar 80 in any suitable manner, as by a splined connection. The arms 83 extend forwardly and upwardly and terminate adjacent the respective cylindrical housing 48. The forward end of each of the arms 83 have a pivotal connection 84 to the lower ends of a connection rod 85, which may be of the turnbuckle type, so as to provide a length adjustment. The upper ends of the rods 85 have a pivotal connection 86 to the upper end of an arm 87. Each arm 87 has its lower end, which is generally bifurcated in shape, connected as by welding to the lower spring seat 54. In this way, the arm 87 will move vertically with the cylinder 34 of the shock absorber 33 and with the ski 18 while at the same time being held against rotation relative to the steering axis O-O. An elongated guide slot 88 is formed in the cylindrical housing 88 so as to permit this axial movement and, if desired, to hold the arm 87 and spring seat against rotation. The sides of the slot 88 and/or the corresponding surfaces of the arm 87 may be coated or provided with an anti-friction material, such as nylon, if desired.

When traveling in a straight path, the skis 18 are free to assume a correct attitude with respect to the ground through pivotal movement relative to the bracket 26 about the pivot pins 24. The elastomeric dampers 27 will have the effect of resiliently maintaining the skis 18 in their normal attitude. If an obstruction is encountered or unevenness of the ground is experienced, each ski 18 will move upwardly about the axis O-O effecting pivotal movement of the links 67 and 69 about the pivot points 68, 70 and 71. Since these pivot axes are parallel to each other, the skis 18 will be held against any pivotal movement about the axis O-O which might otherwise effect steering of the snowmobile during suspension travel. The shock absorber strut 19 and spring 55 will act in the obvious manner so as to damper and cushion these vertical movements and provide a good ride over a wide variety of terrains.

If the amount of relative movement between each ski 18 and the body is the same, the torsion bar 80 will be merely pivoted in its bushings 82 through the action of the links 85 and arms 83 and will not effect the suspension characteristics. If, however, there is some unevenness from side to side, the torsion bar 80 will be appropriately loaded so as to transfer some of the load from the ski 18 at one side to the other.

If the snowmobile 1 is traveling along level terrain and a steering input is delivered by the operator to the steering column 62 by turning of the handlebars 61, the pitman arm 63 will be rotating in the appropriate direction. Rotation of the pitman arm 63 will be transmitted through the respective tie rods 64 and ball joints 65 to rotate the steering arms 66. Since the steering arms 66 are pivotally supported by the housing 30 for rotation about the axis O-O, the pivot pin 66 at the upper end of the link 67 will also be rotated at the same angle. Since the pivots pins 68, 70 and 71 are held at right angles to each other by the links 67 and 69, the bracket 26 and ski 18 will be rotated through the corresponding steering angle so as to change the direction of the snowmobile 1. At the same time, the entire strut assembly 19 will be rotated via the support provided by the bearings 52, 35 and 36 about the same steering axis O-O.

During the steering movement, the skis 18 may still move upwardly and downwardly relative to the body of the snowmobile 1 if rough surfaces are encountered. The struts 19 and spring 55 will act in their normal manner but the links 67 and 69 and their related pivot points 68, 70 and 71 will insure against any change in the steering attitude due to these up and down movements.

If during the turning movement there is a roll force exerted on the body of the snowmobile 1, the strut 19 and spring 55 associated with the outboard ski 18 will tend to move upwardly more than the inboard strut and spring. This relative movement will cause a torsional loading in the torsion bar 80 due to a greater upward movement at its end associated with the outboard link 85 and arm 83 than at the inboard link 85 and arm 83. Thus, a torsional loading is applied to the torsion bar 80 which tends to cause the inboard and outboard struts to equalize their movements relative to the body of the snowmobile 1. Thus, an anti-roll force is generated by the torsion bar 80 and its attachment to the skis 18.

It should be readily apparent from the foregoing description that the connection of the torsion bar 80 to the arms 87 does not interfere with the steering rotation of the skis 18 about their axes O-O. This is true because the arm 87 and the lower spring seat 54 are held against rotation. That is, when the ski 18 is turned due to rotation of the arm 66 and links 67 and 69, the shock absorber assembly 33 and specifically its cylinder 34 and piston rod 41 will rotate freely due to the use of the bearings 35 and 36 and the thrust bearings 52 and 47. The spring 55 and its respective spring seats 50 and 54 will, however, not rotate during the steering of the snowmobile 1. Thus, there will be no loading of the torsion bar 80 or interference from it during the steering movement.

In view of the fact that the torsion bar 80 is connected to each of the steering skis via non-resilient connections, the loading of the torsion bar 80 will be directed related to the amount of movement of the individual skis 18. This is because the arm 87 moves in exactly the same proportion as the suspension travel of the ski 18.

The forward placement of the links 67 and 69 ahead of the strut 19 and specifically the shock absorber cylinder 34 is highly effective to protect the suspension from damage and specifically the shock absorber from damage in the event an obstruction is encountered. In the illustrated embodiment, the torsion bar 80 is connected to the non-rotating element 87 while the shock absorber 33 and its associated cylinder 34 and piston rod 41 are permitted to rotate freely. It is to be understood that this invention is also susceptible of use in an arrangement wherein the shock absorber 33 does not rotate about the axis O-O, but is fixed against such rotation and the ski 18 is otherwise permitted to rotate about its steering axis. With such a modified arrangement, the connection between the torsion bar and the suspension may be to any of the suspension elements which move vertically with the ski 18 but which are fixed against rotation relative to it. Furthermost, although a straight torsion bar has been employed in the illustrated embodiment with rigid arms 83 providing the connection to the vertically movement suspension element, a "U" shape torsion bar may be employed which has its ends directly connected via any suitable joint to the vertically moveable elements of the suspension. Various other changes and modifications may be made without departing from the spirit and scope of the invention, as defined by the appended claims.

We claim:

1. A suspension system for the steering skis of a snowmobile or the like comprising suspension means for suspending each of the skis for movement in a generally vertical direction relative to the body of the snowmobile, means for supporting each of the skis for steering movement about a respective steering axis, said suspension means including a pair of elements each associated with a respective of the skis, each of said elements being movable vertically with the respective ski during suspension movement and fixed against rotation about the respective ski steering axis for steering movement of the respective ski without corresponding rotation of the element about the steering axis, a torsion bar carried by the snowmobile and extending transversely across the body of said snowmobile, and means for torsionally loading the torsion bar upon movement of the respective suspension elements relative to each other upon vertical suspension movement of the skis without effecting loading of the torsion bar upon steering rotation of the ski including means for providing a pivotal connection between each of said elements and said torsion bar.

2. A suspension system as set forth in claim 1 wherein the suspension means suspend the skis for movement about an axis that is coincident with the steering axis of the respective ski.

3. A suspension system as set forth in claim 2 wherein the suspension means comprises a strut having an element supported for longitudinal movement along the suspension axis and for rotary steering movement about the same axis, spring means interposed between said strut and the body of the snowmobile for resiliently resisting axial movement of the strut along the suspension axis relative to the snowmobile body, each suspension element being affixed for axial movement with the strut and supported for relative rotation with respect to the strut.

4. A suspension system as set forth in claim 3 wherein the strut comprises the cylinder of a hydraulic shock absorber assembly, each shock absorber assembly further including a piston and piston rod, and means for affixing said piston rod against axial movement relative to the snowmobile body.

5. A suspension system as set forth in claim 4 wherein the spring means comprises a coil compression spring encircling in part the piston rod and having one of its ends fixed against axial movement relative to the piston rod and the other of its rods fixed against axial movement relative to the cylinder, the element being fixed relative to the other end of said spring means.

6. A suspension system as set forth in claim 1 wherein the means for providing the pivotal connection comprises a variable length link.

* * * * *